LOUIS W. GREVE & JOHN C. CURTIS
INVENTORS

June 23, 1936.   L. W. GREVE ET AL   2,044,880
DRILLING APPARATUS
Filed Sept. 10, 1934   5 Sheets-Sheet 2

LOUIS W. GREVE & JOHN C. CURTIS
INVENTORS

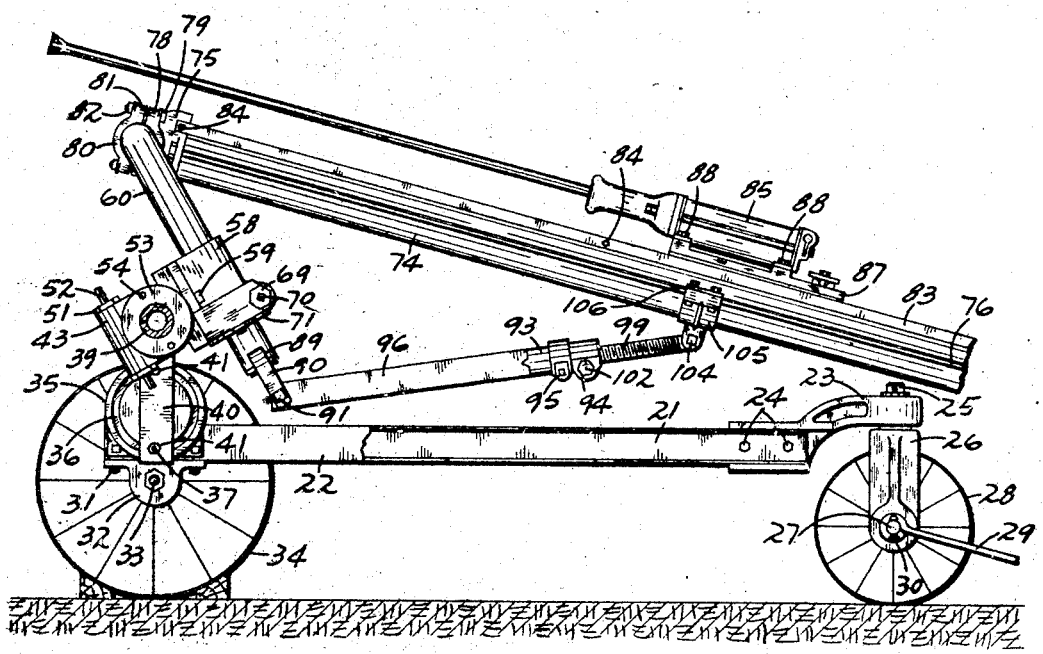

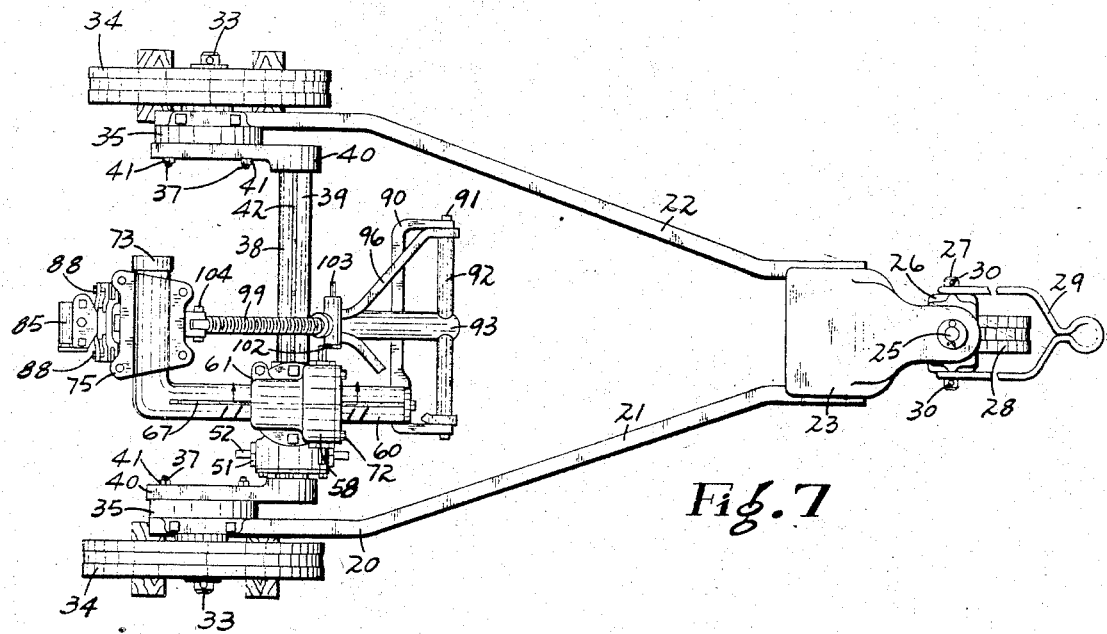
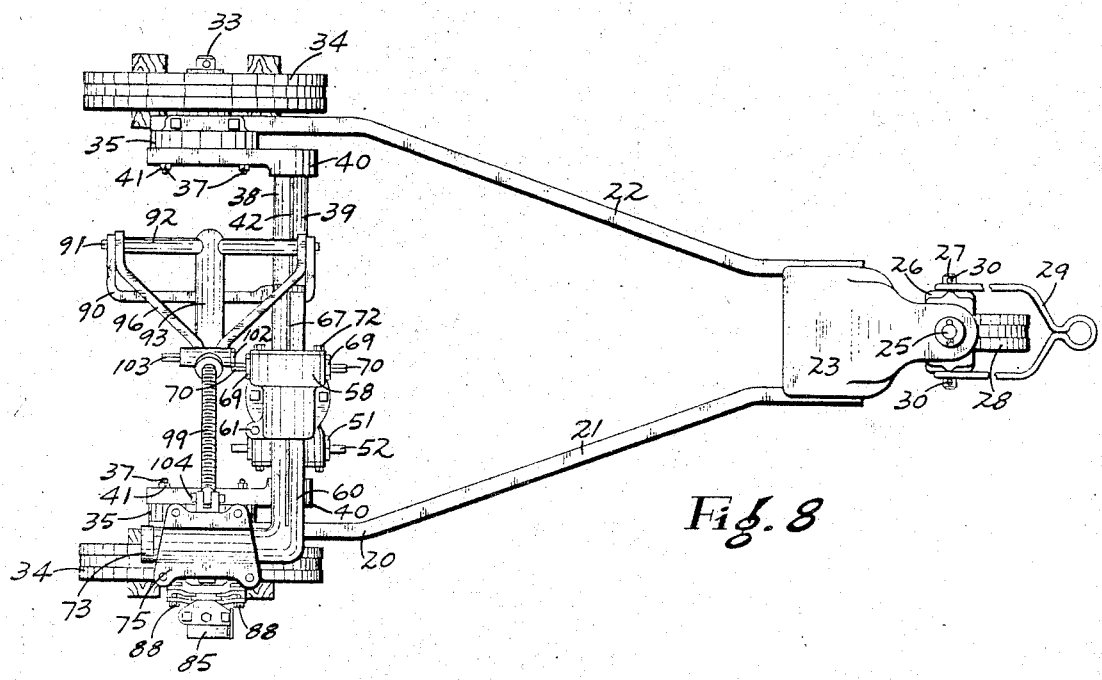
LOUIS W. GREVE & JOHN C. CURTIS
INVENTORS

June 23, 1936.                L. W. GREVE ET AL                2,044,880
DRILLING APPARATUS
Filed Sept. 10, 1934        5 Sheets-Sheet 5

LOUIS W. GREVE & JOHN C. CURTIS
INVENTORS

BY *John E. Renfer*
ATTORNEY

Patented June 23, 1936

2,044,880

UNITED STATES PATENT OFFICE 2,044,880

DRILLING APPARATUS

Louis W. Greve, Cleveland, and John C. Curtis, Garfield Heights, Ohio, assignors to The Cleveland Rock Drill Company, Cleveland, Ohio, a corporation of Ohio Application September 10, 1934, Serial No. 743,430

35 Claims. (Cl. 255—51)

This invention relates broadly to rock drills, but more particularly to a mechanism for supporting and guiding the drill.

One object of this invention is to produce a carriage having a drill guiding frame capable of universal movement thereon, permitting thereby the drilling of holes in any desired position.

Another object of this invention is to produce a wheel supported frame having a drill guiding frame movably mounted thereon and equipped with a simple and efficient mechanism for elevating or lowering the drill guiding frame relatively to the supporting frame.

Another object of this invention is to provide a wagon drill with a mechanism capable of imparting rotation to the drill guiding frame relatively to the wheel supported frame on which the former is movably mounted.

Another object of this invention is to provide a drilling apparatus of the wagon drill type with a mechanism whereby the drill guiding frame may be positioned inside or outside of the wheel supported frame.

Another object of this invention is to provide a drilling apparatus of the aforesaid mentioned type with a mechanism whereby the drill guiding frame is capable of slidable movement relative to the wheel supported frame on which the former is movably mounted.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawings which illustrate the invention:

Figs. 5 and 6 are also views similar to Fig. 1 illustrating the rock drill receiving frame in different positions.

Fig. 7 is a plan view of the wagon drill illustrating the rock drill guiding frame in the position shown in Fig. 1.

Fig. 8 is a view similar to Fig. 7 illustrating the rock drill guiding frame in another position.

Figures 1, 2:
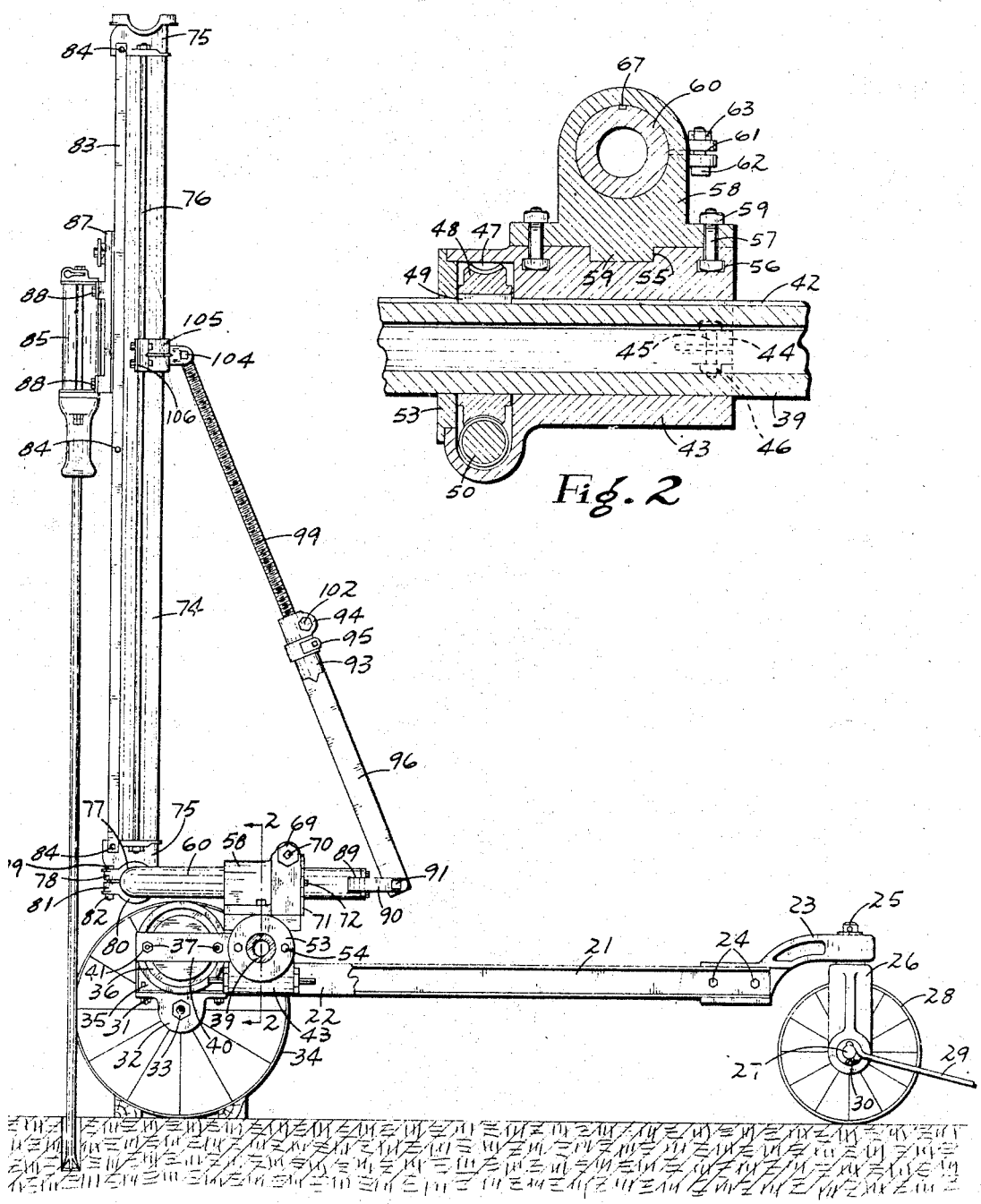
Fig. 1 is a side elevational view of the wagon drill illustrating the rock drill guiding frame in a vertical position.
Fig. 2 is an enlarged cross sectional view taken in a plane indicated by lines 2—2 in Fig. 1.
Figure 4:
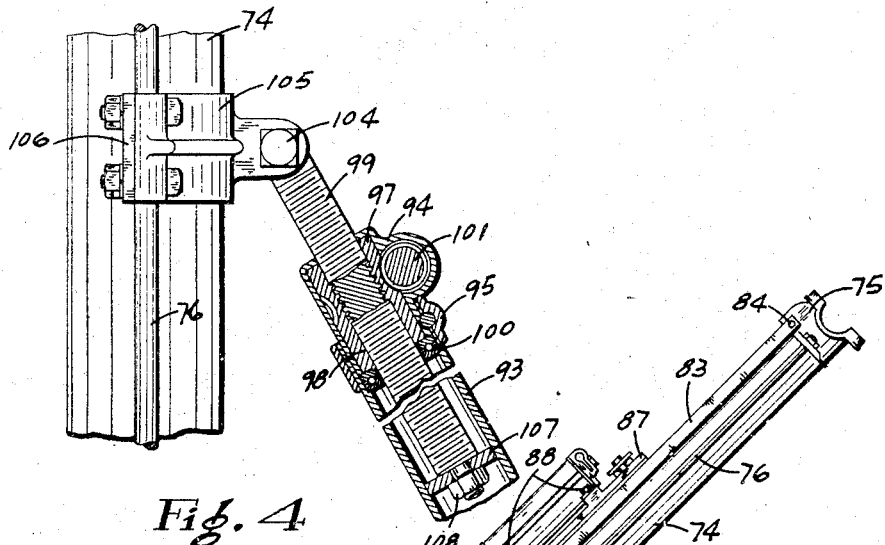
Fig. 4 is an enlarged side elevational view partly in section of the jack-screw shown in Fig. 3.
Figure 3:
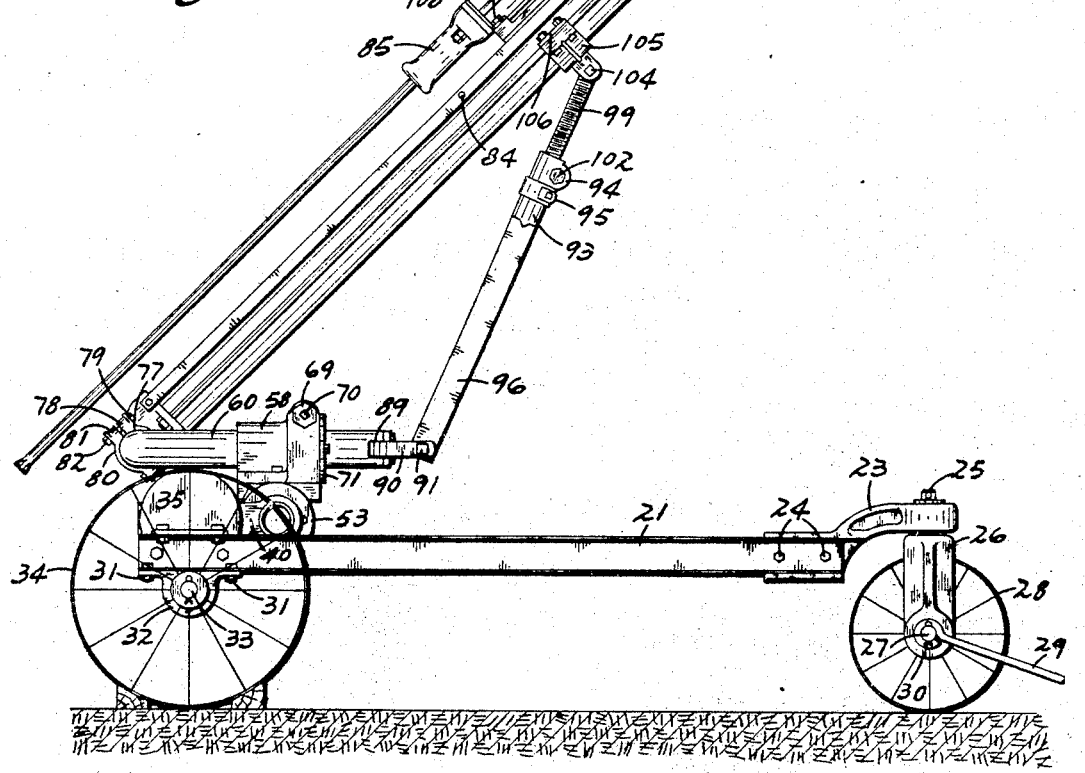
Fig. 3 is a view similar to Fig. 1 illustrating the rock drill guiding frame in an inclined position.
Figure 10:
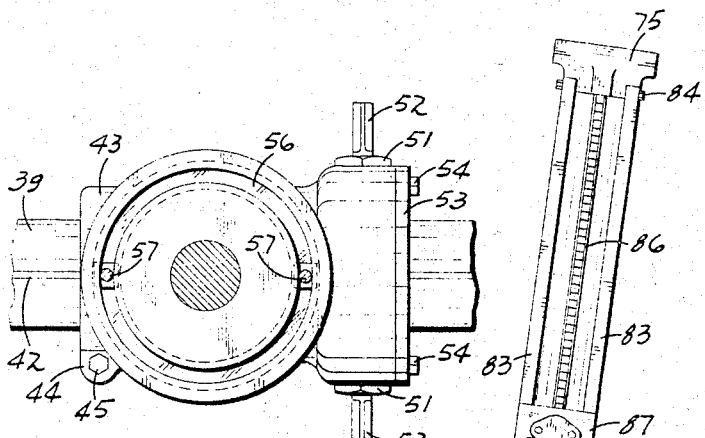
Fig. 10 is an enlarged cross sectional view taken in a plane indicated by line 10—10 in Fig. 9.

Referring to the drawings in which like symbols designate corresponding parts throughout the several views, 20 represents the supporting frame or wagon comprising two side channel bars 21 and 22 united at one end by a casting or bracket 23, which is secured thereto by means of bolts 24. The bracket 23 is properly machined to rotatably receive the shafted portion 25 of a U-shaped bracket 26 depending therefrom. Extending through the end portion of the parallel arms of the bracket 26, there is a shaft 27 having rotatably mounted thereon a wheel 28, which is held in spaced relation with the inside of the bracket by the hub of the former engaging the latter. The end portions of the shaft 27 protrude sufficiently from the bracket 26 to receive a steering handle 29 disposed in straddle relation with the wheel 28 and secured to the shaft 27 by means of cotter pins 30.

Secured to the lower side of the other end portion of each of the channel bars 21 and 22 by bolts 31, there is a casting 32 having a shaft 33 extending therefrom to the exterior of the channel bars, and adapted to rotatably receive a wheel 34. Similarly secured to the inner side of each of the channel bars 21 and 22 above the casting 32, there is another casting 35 having the internal vertical wall thereof formed with a circular T-shaped groove 36, within which are slidably mounted two bolts 37. Located between the side members 21 and 22, there is a supporting shaft or yoke 38, comprising a tubular member 39 having welded thereto at each end thereof an arm 40 formed with two apertures properly located to receive the bolts 37, which extends from the groove 36. Each of the bolts 37 extend sufficiently from the arm 40 to receive a nut 41, by which the yoke 38 may be secured to the stationary castings 32 in any desired position. The tubular member 39 is formed with a longitudinally disposed key slot 42 extending the full length thereof, the purpose of which will be explained later.

Slidably and rotatably mounted on the tubular member 39 of the yoke 38, there is a casing 43 formed with a clamping device comprising a laterally disposed slotted lug 44 having a bolt 45 therethrough adapted to receive a nut 46, by which the upper and the lower portion of the lug 44 may be brought toward each other for clamping the casing 43 on the tubular member 39. Toward one end, the casing 43 is formed with an internal chamber 47, adapted to accommodate a worm gear 48 having a key 49 slidable within the key slot 42 formed on the tubular member 39 on which the worm gear 48 is mounted. Transversely disposed within the chamber 47 in rotatable interengagement with the teeth of the worm gear 48, there is a worm 50 having each of its end portions accurately machined for close fit rotatable engagement within a nut 51 screwed within the casing 43. The free end 52 of each of said portions extends to the exterior of the casing, and is properly machined to receive a wrench or handle by which the worm screw may be rotated. The chamber 47 is closed from the exterior by a cover 53 secured to the casing by means of bolts 54. The upper external wall of the casing 43 is provided with a counterbore, and a concentrically disposed T-shaped circular groove 56 having slidable therein, the heads of two bolts 57. Rotatably mounted on this upper face of the casing 43, there is a housing 58 provided with a stem 109 depending therefrom into the counterbore 55. The housing 58 is formed with a flange formed with two apertures adapted to receive the bolts 57, which extend sufficiently therefrom to receive the nuts 59 by which the housing 58 may be secured to the casing 43 against rotation. The upper portion of the housing 58 is accurately bored to receive a bar 60 rotatable and slidable therein, which may be clamped therein by means of a clamping device comprising a laterally extending slotted lug 61 having a bolt 62 therethrough adapted to receive a nut 63. Toward one end, the housing 58 is also formed with an internal chamber 64 having a worm gear 65 rotatable therein. This worm is also provided with a key 66 slidable within a key slot 67 longitudinally disposed within the bar 60. Transversely disposed within the chamber 65, there is a worm 68 having the teeth thereof in interengagement with the teeth of the worm gear 65. Each of the end portions of the worm 68 is also accurately machined for close fit rotatable engagement within a nut 69 screwed within the housing 58, while the free end 70 of each of said end portions extends from the nut 69, and is properly machined to receive a wrench by which the worm 68 may be rotated. The chamber 64 is also closed by a cover 71 secured to the housing 58 by bolts 72. The bar 60 is bent to constitute a relatively short arm 73 integral with the bar 60, but disposed at right angle therewith.

Detachably secured to the arm 73, there is a rock drill guiding frame comprising a tube 74 having affixed to each end thereof a head 75 secured thereto by long bolts or side rods 76. The portion of each head 75 protruding from the tube is elongated to extend laterally past the marginal edge of the tube, and is formed with a semi-circular groove 77 adapted for engagement over the arm 73. Corresponding to the portion of the head 75 engageable with the arm 73, there is a cap 80 also formed with four apertured lugs 81 through which the bolts 79 are free to pass to receive the nuts 82, by which the rock drill guiding frame 74 may be secured to the arm 73.

Extending the full length of the tube 74, there are two parallel guides 83 secured thereto by bolts 84. These guides are adapted to receive a rock drill 85, which is slidably mounted therein.

Located in the interior of the tube 74, there is a fluid actuated feeding mechanism capable of transmitting feeding motion to the rock drill 85 by means of a chain 86, which is connected to a support or slabback 87 on which the rock drill 85 is rigidly secured by clamps 88. Since the feeding mechanism does not constitute a part of the present invention, no description of the same is thought necessary.

The other end portion of the bar 60 is formed with a transversally disposed slot 89 having bolted therein in offset relation with the bar 60 a U-shaped bracket 90 which extends from the bar 60 in parallel alignment with the small arm 73. Pivotally secured to the bracket 90 by a bolt 91 extending therethough, there is a cross tube 92 having welded thereon at right angle therewith a tubular member 93 having the end portion thereof, away from the cross member 92, properly machined to receive a casing 94, which is secured thereto by a clamp 95. Leading from the casing 94 to each of the side arms of the U-shaped bracket 90, there is a brace 96. The casing 94 is properly machined to rotatably receive a worm gear 97 provided with a screw threaded bore 98 adapted to receive a screw 99. The worm gear or nut 97 is locked against longitudinal movement in one direction by the casing 94 overlapping one end of the former, and in the other direction by a thrust ball bearing 100 secured within the tubular member 93. Adjacent the worm gear 97, the casing 94 is formed with a chamber accommodating a worm 101 having the teeth thereof engaging the teeth of the worm gear 97. The worm 101 is locked against accidental removal from the casing 94 by a nut 102, and is provided with a portion 103 protruding from the casing 94 and formed to receive a wrench by which the worm may be rotated. The end of the screw 99 protruding from the casing 94 is pivotally mounted by a bolt 104 to a bracket 105 which is detachably secured to the side rods 76 by clamps 106. Limiting the travel of the screw 99 out of the nut 97, there is a washer 107 which is mounted on the end of the screw within the tubular member 93, and is secured thereon by a nut 108.

With the present construction, since the frame 20 is supported by the wheels 34 and 28, it will be understood that the entire drilling apparatus may readily be moved about without difficulty. When it is desired to drill a vertical hole in a ground or rock having a relatively smooth and horizontal surface, the drilling apparatus may be positioned as illustrated in Fig. 1, and the drilling operation may take place after the wheels 34 have been blocked to prevent any possible movement of the drilling apparatus relative to the hole being drilled. In quarry work, it is often necessary to drill a series of vertical holes in longitudinal alignment with the supported frame. Heretofore, this was accomplished by removing the blocks from the wheels 34 after the drilling of each hole, and moving the entire drilling apparatus or wagon drill a distance equal to the desired space wanted between the holes. With the present construction, a certain number of holes may be drilled in longitudinal alignment without necessitating the moving of the frame 20. Referring to Fig. 1, it will be seen that the yoke 38 comprising the tubular member 39 on which the guiding frame 74 is mounted, could be rotated, by loosening the bolts 37, and positioned at 180° from the position shown in Fig. 1. The bar 60, by loosening the nut 46 of the clamp 44, could also be moved toward the left until the bracket 90 touches the housing 43, thus positioning the drill guiding frame 74 and consequently the rock drill 85 ahead of the left end of the frame 20. After the drilling of one hole, the drill guiding frame 74, may be moved toward the right by simply sliding the bar 60 through the casing 43. In this instance, the angular movement of the guiding frame 74 is prevented by the key 49 engaging the slot 42, the worm gear 48 being locked against rotation by the worm 50 engaging the latter, thus affording a guiding mechanism permitting the holes to be drilled in perfect alignment. When the bar 60 has been moved to its extreme rightward position, the yoke 38 may be swung around and positioned as illustrated in Fig. 1. Thereafter the bar 60 may again be moved to the left until the bracket 90 engages the casing 43, and the drilling may be resumed by sliding the bar 60 to right after the drilling of each hole until the bar 60 reaches the end of its rightward travel, thus permitting the drilling of a series of holes in longitudinal alignment with the wagon drill, without necessitating the moving of the drilling apparatus after the drilling of each hole. By loosening the nuts 59 which secure the housing 58 to the casing 43, the bar 60, and consequently the guiding frame 74 and screw jack 93 may be swung in any desired angular relation with the frame 20. Since the bar 60 and its supporting housing 58 is rotatably mounted on the yoke 38, it will be understood that it is possible to drill a series of holes in perfect alignment and in any angular relation with the frame 20. For instance when a series of holes is desired to be drilled parallel with the shafts 33 of the wheels 34, the bar 60 may be positioned as illustrated in Fig. 8, permitting thereby the drilling of a certain number of holes outside of the frame 20. If the drilling of the holes is intended to extend from the outside to the inside of the frame 20, or from one side of the latter to the other side thereof, the yoke 38 may be swung toward the left, thus positioning the guiding frame 74 ahead of the wheels 34. In this instance, the casing 43 may be slid toward the channel bar 21 on the tubular member 39 of the yoke 38, by loosening the nuts 46 of the clamping bolt 45. Similarly the bar 60 may be slid through the housing 58 by loosening the nut 63 of the clamping bolt 62, thus positioning the guiding frame well outside of the frame 20. After the drilling of each hole, the casing 43 may be slid toward the channel bar 22 on the yoke 38 until the former touches the arm 40. Subsequently the bar 60 may be moved similarly through the housing 58, affording thereby a relatively long lateral movement of the guiding frame relative to the frame 20. The alignment of the holes is constantly assured by the engagement of the key 49 within the slot 42 disposed on the tubular member 39 of the yoke 38, or by the similar engagement of the key 66 within the slot 67 formed on the bar 60. It will be understood that while the guiding frame is thus capable of slidable movement, it may also be revolved around the center axis of the stem 109 rotatably mounted within the counter-bore 55 illustrated in Fig. 2. By loosening the nuts 59 of the bolts 57 slidably mounted within the annular groove 56, it is possible to drill a series of holes in a circular disposition, the extent of the radius of the circle being equal to the distance between the center axis of the rock drill 85 and that of the stem 109. This radius may be varied by sliding the bar 60 through the housing as previously explained.

Through the medium of the screw jack 93, it is possible to lower or elevate the guiding frame 74 relatively to the frame 20. In this instance, it is first necessary to loosen the nuts 82 to permit a free rotation of the head 75, which is secured to the end of the guiding frame 74, on the arms 73 of the bar 60. Subsequently the worm 101 may be rotated, thus causing the rotation of the worm gear or nut 97, and the consequential longitudinal movement of the screw 99. In this manner, the guiding frame 74 may be moved from one of its extreme positions shown in Fig. 5, to a position well beyond the vertical. The screw 99 is of a length calculated to permit the guiding frame 74 to be moved in any desired position within an arc of about 90°. When it is desired to raise the guiding frame 74 in a vertical position as shown in Fig. 1, the worm 101 may be rotated until the screw 99 has reached the extreme end of its travel, or until the washer 107 engages the ball bearing 100. Subsequently the nuts 82 of the bolts 79 may be tightened for rigidly securing the guiding frame 74 on the arm 73 of the bar 60. Thereafter the clamps 106 may be loosened from the side rods 76, permitting thereby the slidable movement of the bracket 105 on the guiding frame 74 when the worm 101 is rotated in an adverse direction to retract the screw 99. When the screw is again at the end of its inward travel, the clamps 106 may again be tightened and the nut 82 be loosened, thus permitting a further movement of the guiding frame 74 when the worm 101 is rotated to cause the outward longitudinal movement of the screw. By reason of the possible slidable movement of the clamp or bracket 105 on the guiding frame 74, it will now be understood that the guiding frame may be rotated within an arc which is greater than that rendered possible by the screw 99. When the guiding frame is loosened in any of the aforesaid angular positions, it is understood that the bar 60 is still slidable within the housing 58, as previously explained, by loosening the clamps 61. For instance, when the drill guiding frame is positioned as illustrated in Fig. 6, it is possible to drill a vertical line of holes by simply sliding the bar 60 through the housing 58, the alignment of the holes being assured by the engagement of the key 66 within the slot 67 formed on the bar 60.

When the nut 46 of the clamping bolt 45 is loosened to permit the slidable movement of the casing 43 on the yoke 38 or tubular member 39 as previously mentioned, the casing 43 may be rotated on the tubular member 39 by simply rotating the worm 50. Since the worm gear 48 is held against rotation relative to the tubular member 39 due to the engagement of the key 49 within the slot 42, the rotation of the worm 50 will cause the latter to revolve around the worm gear 48, thus causing the consequential rotation of the housing 43 together with the bar 60 and the guiding frame 74 around the tubular member 39 of the yoke 38. In this manner, it will be seen that the angular position of the guiding frame 74 relative to the frame 20, may be altered without resorting to the screw jack 93, permitting thereby a quick angular adjustment of the guiding frame 74, irrespective of the clamping engagement of the latter on the arm 73.

Figure 11:
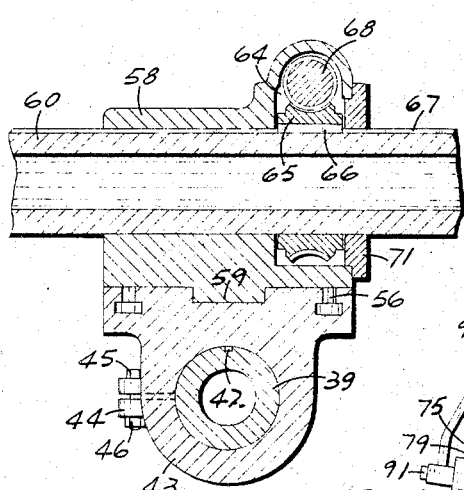
Fig. 11 is also an enlarged cross sectional view taken in a plane indicated by line 11—11 in Fig. 7.
Figure 9:
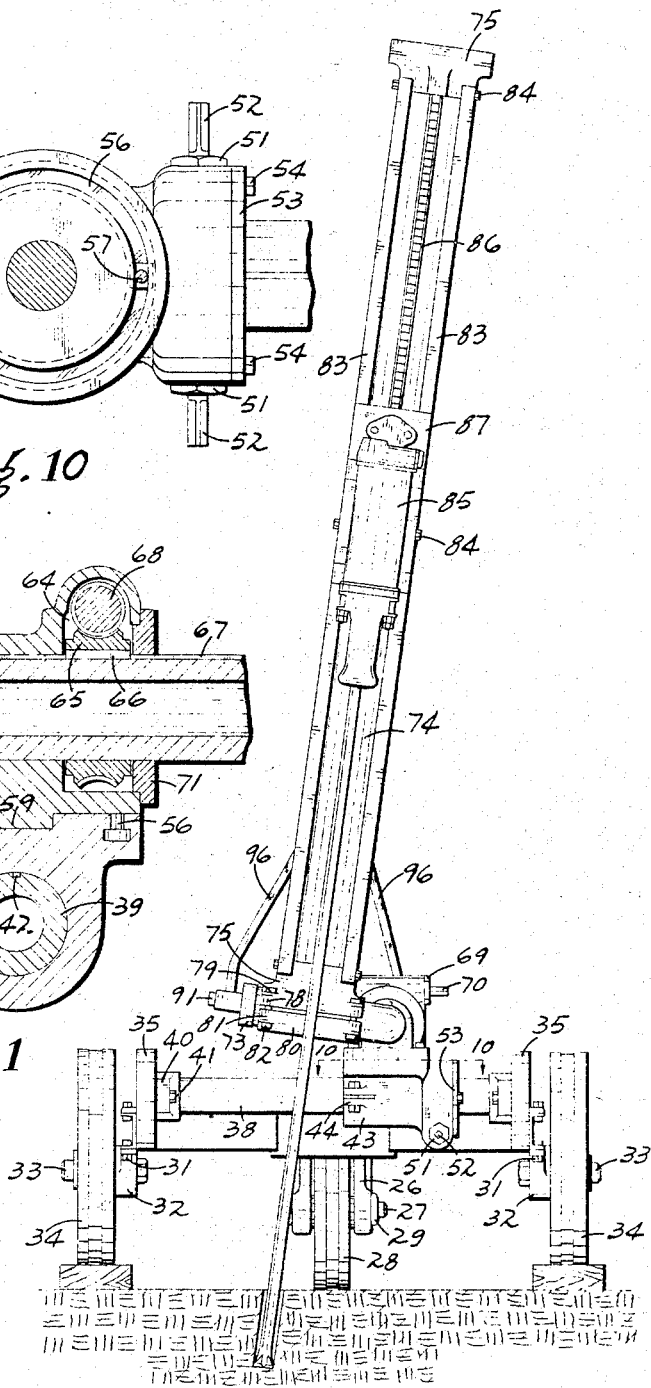
Fig. 9 is a rear end elevational view of the wagon drill, the rock drill guiding frame being shown in an inclined position.

The angular position of the guiding frame 74 in a sidelong direction may be varied by rotating the worm 68 shown in Fig. 11. The worm gear 65 being connected to the bar 60 by the key 66 engaging the slot 67, the rotation of the former will be transmitted to the bar 60 and consequently to the guiding frame 74, thus permitting the latter to be positioned as illustrated in Fig. 9. With the present construction, it will be understood that when the yoke 38 is located ahead of the wheels 34, the guiding frame 74 may be rotated from one side of the frame 20 to the other side thereof; the rotation of the guiding frame 74 in a lateral plane being only limited by the engagement of the free end thereof with the ground.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a drilling apparatus, a mechanism for supporting and guiding a drill comprising a supporting frame, a substantially U-shaped cross member pivotally connected to said frame, an arm movably secured to said member, a drill guiding frame mounted on said arm, and means for establishing a rigid connection between said frames in any position assumed by said drill guiding frame by virtue of the pivotal connection of said member with said supporting frame and by virtue of the movement of said arm relative to said member.

2. In a drilling apparatus, a mechanism for supporting and guiding a drill comprising a supporting frame, a substantially U-shaped cross member pivotally connected to said frame, an element secured to said cross member capable of revolving around the longitudinal axis thereof and of rotating on an axis normal to said longitudinal axis, a drill guiding frame pivotally connected to said element, and means for securing said drill guiding frame in any position possible by virtue of the revolving and rotating movements of said element and by virtue of said pivotal connections.

3. In a portable drilling rig, a carrying frame including two side members having an open portion therebetween, supporting means for said frame, a tool supporting member pivotally connected to said carrying frame, an element carried by said member capable of slidable movement relative thereto, a drill guiding frame supported by said element on an axis parallel to the pivotal axis of said member, one end of said drill guiding frame being capable of movement through the open portion of the carrying frame due to the pivotal movement of said member, said drill guiding frame being adjustable longitudinally of said carrying frame by the slidable movement of said element, and means for locking the two frames against relative movement.

4. In a portable drilling rig, a carrying frame including two side members having an open portion therebetween, supporting means for said frame, a tool supporting member pivotally connected to said carrying frame, an element carried by said member capable of slidable movement relative thereto, a drill guiding frame supported by said element, one end of said drill guiding frame being capable of movement through the open portion of the carrying frame due to the pivotal movement of said member, said drill guiding frame being adjustable transversally of said carrying frame from the interior to the exterior of the marginal edge thereof by the slidable movement of said element, and means for locking the two frames against relative movement.

5. In a portable drilling rig, a carrying frame including two side members having an open portion therebetween, supporting means for said frame, a cross member carried by said frame extending through the open portion of the latter, an element carried by said cross member capable of rotatable and slidable movement relative thereto, a drill guiding frame pivotally connected to said element, one end of said drill guiding frame being capable of universal movement through the open portion of said carrying frame due to its pivotal connection with said element and the rotatable and slidable movement of the latter, and means for locking the two frames against relative movement.

6. In a portable drilling rig, a carrying frame including two side members having an open portion therebetween, supporting means for said frame, a tool supporting member pivotally connected to said carrying frame, an element carried by said member capable of rotation relative thereto in a plane substantially parallel to said carrying frame, a drill guiding frame supported by said element, one end of said drill guiding frame being normally capable of movement through the open portion of the carrying frame due to the pivotal movement of said member, said drill guiding frame being movable from the interior to the exterior of the marginal edge of said carrying frame due to the rotation of said element, and means for locking the two frames against relative movement.

7. In a portable drilling rig, a carrying frame including two side members having an open portion therebetween, supporting means for said frame, a tool supporting member pivotally connected to said carrying frame, an element carried by said member capable of pivotal movement relative thereto in a plane substantially parallel to said carrying frame, a drill guiding frame supported by said element, one end of said drill guiding frame being normally capable of movement through the open portion of the carrying frame due to the pivotal movement of said member, said drill guiding frame being movable from one to the other of said side members due to the pivotal movement of said element, and means for locking the two frames against relative movement.

8. In a portable drilling rig, a carrying frame including two side members having an open portion therebetween, supporting means for said frame, a tool supporting member pivotally connected to said carrying frame and extending through said open portion, an element carried by said member extending to the exterior of the marginal edge of said carrying frame, said element being capable of rotation on its own axis, a drill guiding frame supported by said element in the exterior of the marginal edge of the carrying frame, said drill guiding frame being elevated or lowered relative to said carrying frame due to the pivotal movement of said member and being pivotally movable in a longitudinal vertical plane due to the rotation of said element, and means for locking the two frames against relative movement.

9. In a portable drilling rig, the combination of a carrying frame having an open center, supporting means for said frame, a tool supporting frame pivotally connected to said carrying frame, a rock drill mechanism supported by said supporting frame on an axis normally parallel to the pivotal axis of said supporting frame, a connecting mechanism between said supporting frame and said drilling mechanism, said drilling mechanism being normally capable of movement through the open center of the carrying frame by the pivotal movement of said supporting frame, and means included in said connecting mechanism whereby said drilling mechanism may be positioned outside of the marginal edge of said carrying frame while supported by said supporting frame.

10. In a portable drilling rig, a carrying frame, supporting means for said frame, a substantially U-shaped member pivotally connected to said carrying frame, an element carried by said member capable of longitudinal slidable movement relative thereto, a drill guiding frame detachably secured to said element, and means for establishing a rigid connection between the two frames in any position assumed by the drill guiding frame by virtue of the pivotal connection of the U-shaped member with the carrying frame and the slidable movement of said element.

11. In a drilling apparatus, a mechanism for supporting and guiding a drill comprising a supporting frame, an arm slidably secured to said frame in transversal relation therewith, a drill guiding frame having one end pivotally connected to said arm, means responsive to the slidable movement of said arm for moving said drill guiding frame while in a vertical position from the inside to the outside of the marginal edge of said supporting frame, and means for locking said drill guiding frame to said arm in different positions possible by virtue of its pivotal connection therewith and irrespective of its location relative to said supporting frame.

12. In a drilling apparatus, a mechanism for supporting and guiding a drill comprising a supporting frame, a member carried by said frame capable of slidable and rotatable movement relative thereto, said member being formed with an offset portion, a drill guiding frame having one end thereof pivotally connected to said offset portion, and means for establishing a rigid connection between said frames in any position assumed by said drill guiding frame by virtue of the slidable and rotatable movement of said member and by virtue of the pivotal connection between said drill guiding frame and the offset portion of said member.

13. In a drilling apparatus, a mechanism for supporting and guiding a drill comprising a supporting frame, a substantially arch-shaped member pivotally connected to said frame, an element carried by said member capable of slidable movement realtive thereto, a drill guiding frame detachably secured to said element, means for locking said element in elevated or lowered position possible by virtue of the pivotal connection of said member, and means for locking said drill guiding frame in any position possible by virtue of the slidable movement of said element irrespective of the location of the latter in said elevated or lowered position.

14. In a drilling apparatus, a device for supporting and guiding a drill comprising a carrying frame, a U-shaped supporting frame pivotally connected to said carrying frame, a drill guiding frame movably supported by said supporting frame, a mechanism associated with said drill guiding frame capable of elevating or lowering one end thereof relatively to said carrying frame, and means independent of said mechanism whereby the latter and said drill guiding frame may be rotated relative to said first mentioned frame on an axis substantially parallel to the longitudinal center axis of said carrying frame.

15. In a drilling apparatus, a mechanism for supporting and guiding a drill comprising a supporting frame, a member carried thereby capable of rotation relative thereto on an axis substantially parallel to the longitudinal center axis of said supporting frame, a drill guiding frame, a jack operatively connected to the latter, and means for pivotally securing one end of said drill guiding frame and of said jack to said member.

16. In a drilling apparatus, a mechanism for supporting and guiding a drill comprising a supporting frame, a drill guiding frame and a jack pivotally supported by said first mentioned frame, and a connection between said jack and drill guiding frame affording the former to impart pivotal movement to the latter, said connection being adjustable on said drill guiding frame in a manner affording a pivotal movement of said drill guiding of a range materially greater than that normally possible by one complete operative travel of said jack.

17. In a drilling apparatus, a mechanism for supporting and guiding a drill comprising a supporting frame, a drill guiding frame and a jack movably supported by said first mentioned frame, said jack comprising a screw longitudinally movable through a rotatable nut, and a connection between said drilling guiding frame and one end of said screw whereby the latter may be operatively connected to the former during successive complete travel of said screw in one direction irrespective of the travel thereof in the other direction, affording thereby a step by step pivotal movement of said drill guiding frame in an arc of an extent materially greater than that resulting from a single operative travel of said screw.

18. In a drilling apparatus, a mechanism for supporting and guiding a drill comprising a supporting frame, a cross member pivotally secured to said frame, an element mounted on said member and capable of rotation relatively thereto, a drill guiding frame detachably secured to said element, and means capable of operation for alternatively imparting rotary movement to said drill guiding frame around two axes disposed at right angles with each other, said means including a duality of rotation mechanisms one associated with said member and the other associated with said element.

19. In a drilling apparatus, a mechanism for supporting and guiding a drill comprising a supporting frame, an elongated frame having a drill slidably guided thereon, a substantially arch-shaped member capable of pivotal movement relative to said frame, and element carried by said member adapted to be elevated or lowered by virtue of the pivotal movement of said member, said element being capable of slidable and rotatable movement relative to said member, said elongated frame being detachably secured to said element, the rotation of said element causing said elongated frame and drill to be moved in positions for drilling parallel holes in a substantially circular disposition, and means responsive to the slidable movement of said element for varying the diameter of the circle on which said holes may be drilled.

20. In a drilling apparatus, a mechanism for supporting and guiding a drill comprising a supporting frame, a housing carried thereby, a member detachably secured to said housing, said housing and member being capable of rotati n in a transversal vertical plane relative to said supporting frame, a drill guiding frame attachable to said member in parallel alignment with said supporting frame, the rotation of said member causing said drill guiding frame to rotate around an axis substantially parallel to the longitudinal center axis of said supporting frame while said drill guiding frame remains in said parallel alignment.

21. In a drilling apparatus, a mechanism for supporting and guiding a drill comprising a supporting frame, a housing carried thereby, a member detachably secured to said housing, said housing and member being capable of rotation on an axis parallel to the longitudinal center axis of said supporting frame, a drill guiding frame attachable to said member in parallel alignment with said supporting frame, the rotation of said member causing said drill guiding frame to rotate around the longitudinal center axis of said supporting frame while said drill guiding frame remains located in said substantially horizontal position.

22. In a portable drilling rig, a carrying frame having an open center portion, supporting means for said frame, a substantially U-shaped tool supporting element having its legs pivotally connected to said carrying frame, the space between the pivotal connections being unobstructed, a tool receiving arm connected to said supporting element for radial movement in a plane within which said member is positionable due to the pivotal movement of said element, and means for establishing a rigid connection between said carrying frame and said tool receiving arm.

23. In a portable drilling rig, a carrying frame including two side members having an open portion therebetween, supporting means for said frame, a tool supporting member connected to said frame for pivotal movement through the open portion thereof, an arm movably secured to said member, a drill guiding frame mounted on said arm, and means for establishing a rigid connection between said frames in any position assumed by said drill guiding frame due to the pivotal movement of said member and the movement of said arm relative thereto.

24. In a portable drilling rig, the combination of a flat open center carrying frame, supporting means for said frame, a tool supporting frame pivotally connected to said carrying frame including an L-shaped element, a rock drilling mechanism connected to one arm of said L-shaped element for pivotal movement on an axis parallel to the pivotal axis of said tool supporting frame, one end of said drilling mechanism being capable of movement through the open center of the carrying frame, said drilling mechanism being adjustable longitudinally of said carrying frame by the pivotal movement of the supporting frame, and means for locking the two frames against relative movement.

25. In a drilling apparatus, a mechanism for supporting and guiding a drill comprising a supporting frame, a substantially U-shaped cross member connected to said frame for pivotal movement relative thereto, an arm movably secured to said member, a drill guiding frame pivotally movable on said arm, the pivotal axis of said drill guiding frame being adjustable angularly from a position parallel to the pivotal axis of said cross member due to the movement of said arm, and means for establishing a rigid connection between said frames in any position assumed by said drill guiding frame due to the movements aforesaid.

26. In a portable drilling rig, a mechanism for supporting and guiding a drill comprising a carrying frame, a sectional drill supporting frame including a substantially U-shaped cross member pivotally connected to said carrying frame and an arm movably secured to said member, a drill mounted on said arm, and means for establishing a rigid connection between said frames in any position assumed by the drill by virtue of the pivotal connection of said member with said carrying frame and by virtue of the movement of said arm relative to said member.

27. In a portable drilling rig, a carrying frame including two side members having an open portion therebetween, supporting means for said frame, a sectional tool supporting frame including a member pivotally connected to said carrying frame and an element carried by said member capable of slidable movement relative thereto, a drilling mechanism supported by said supporting frame on an axis parallel to the pivotal axis of said member, one end of said drilling mechanism being capable of movement through the open portion of the carrying frame due to the pivotal movement of said member, said tool supporting frame being adjustable in length due to the slidable movement of said element, said drilling mechanism being adjustable longitudinally of said carrying frame due to the adjustable length of said tool supporting frame, and means for locking said frames against relative movement.

28. In a portable drilling rig, the combination of a carrying frame, supporting wheels carried by said frame, a substantially U-shaped member, means pivotally connecting said member to said carrying frame, an elongated element carried by said member, means movably connecting said element to said member, said member and element constituting a tool supporting frame having a drill guiding frame carried thereby, said pivotally and movably connecting means including means for holding said tool supporting frame in adjusted position.

29. In a portable drilling rig, the combination of a carrying frame having an open center, supporting means for said frame, a tool supporting frame pivotally connected to said carrying frame, an element movably connected to said supporting frame, a rock drilling mechanism pivotally connected to said element, the pivotal axis of said drilling mechanism being movable from a position parallel to the pivotal axis of said supporting frame to a position out of parallel therewith due to the movement of said element relative to said supporting frame, one end of said drilling mechanism being capable of movement through the open center of the carrying frame, said drilling mechanism being adjustable longitudinally of said carrying frame by the pivotal movement of the supporting frame, and means for locking the two frames against relative movement.

30. In a portable drilling rig, a carrying frame including two side members having an open portion therebetween, supporting means for said frame, a cross member carried by said frame capable of movement through the open portion of the latter, an L-shaped element movably carried by said cross member capable of pivotal movement and of rotation on an axis perpendicular to that of its pivotal axis, a drill guiding frame supported by said element, one end of said drill guiding frame being normally capable of movement through the open portion of the carrying frame due to the pivotal movement of said element, said drill guiding frame being movable from the interior to the exterior of the marginal edge of said carrying frame due to the rotation of said element, and means for locking the two frames against relative movement.

31. In a portable drilling rig, a carrying frame including two side members having an open portion therebetween, supporting means for said frame, a tool supporting member pivotally connected to said carrying frame, an element carried by said member capable of rotation relative thereto in a plane substantially parallel to said carrying frame, a drill guiding frame supported by said element, one end of said drill guiding frame being normally capable of movement through the open portion of the carrying frame due to the pivotal movement of said member, said drill guiding frame being movable from one side to the other side of said tool supporting member due to the rotation of said element, and means for locking the two frames against relative movement.

32. In a portable drilling rig, a carrying frame including two side members having an open portion therebetween, supporting means for said frame, a tool supporting member pivotally connected to said carrying fame, an element carried by said member capable of rotation relative thereto in a plane substantially parallel to said carrying frame, a drill guiding frame supported by said element, one end of said drill guiding frame being normally capable of movement through the open portion of the carrying frame due to the pivotal movement of said member, said drill guiding frame being arcually movable due to the rotation of said element, and means for locking the two frames against relative movement.

33. In a drilling apparatus, a mechanism for supporting and guiding a drill comprising a supporting frame, an arm slidably secured to said frame in transversal relation therewith, a drill guiding frame having one end pivotally connected to one end of said arm, a brace pivotally connecting said drill guiding frame to the other end of said arm and forming with said arm and drill guiding frame a substantially triangular structure, said structure being movable transversally of said supporting frame for positioning said drill guiding frame inside or outside of the marginal edge of said supporting frame, said drill guiding frame being adjustable angularly with respect to said arm due to the pivotal connection therebetween, and means for locking said structure and supporting frame against relative movement.

34. In a drilling apparatus, a mechanism for supporting and guiding a drill comprising a supporting frame, a substantially U-shaped cross member pivotally connected to said frame, an arm movably secured to said member, a drill guiding frame mounted on one end of said arm, a brace connecting said drill guiding frame to the other end of said arm and forming with said arm and drill guiding frame a substantially triangular structure, and means for establishing a rigid connection between said supporting frame and structure in any position assumed by said structure by virtue of the pivotal connection of said member with said supporting frame and by virtue of the movement of said arm relative to said member.

35. In a drilling apparatus, a device for supporting and guiding a drill comprising a supporting frame, an elongated element carried by said frame in substantially parallel alignment therewith, a drill guiding frame pivotally connected to said element, a mechanism associated with said drill guiding frame and element for imparting pivotal movement to the former relative to the latter, said element being rotatable on its own axis and on an axis perpendicular thereto for effecting the corresponding rotation of said drill guiding frame and mechanism, and means for locking said frames against relative movement.

LOUIS W. GREVE.
JOHN C. CURTIS.